United States Patent
Parsons et al.

(10) Patent No.: US 10,828,668 B2
(45) Date of Patent: Nov. 10, 2020

(54) TEXTURED HARDCOAT FILMS

(71) Applicant: MacDermid Enthone Inc., Waterbury, CT (US)

(72) Inventors: Keith Paul Parsons, Swindon (GB); Herrick Man Hin Yu, Newbury (GB)

(73) Assignee: MacDermid Enthone Inc., Waterbury, CT (US)

( * ) Notice: Subject to any disclaimer, the term of this patent is extended or adjusted under 35 U.S.C. 154(b) by 313 days.

(21) Appl. No.: 15/717,275

(22) Filed: Sep. 27, 2017

(65) Prior Publication Data

US 2019/0091724 A1    Mar. 28, 2019

(51) Int. Cl.

| | |
|---|---|
| *B05D 5/02* | (2006.01) |
| *B29C 45/14* | (2006.01) |
| *B29C 69/02* | (2006.01) |
| *B05D 3/02* | (2006.01) |
| *B29C 69/00* | (2006.01) |
| *B05D 3/06* | (2006.01) |
| *B29K 669/00* | (2006.01) |
| *B05D 1/28* | (2006.01) |
| *B29C 51/10* | (2006.01) |
| *B05D 7/04* | (2006.01) |
| *B05D 1/42* | (2006.01) |

(52) U.S. Cl.
CPC ............ *B05D 5/02* (2013.01); *B05D 3/0272* (2013.01); *B29C 45/14688* (2013.01); *B29C 69/001* (2013.01); *B29C 69/02* (2013.01); *B05D 1/28* (2013.01); *B05D 1/42* (2013.01); *B05D 3/067* (2013.01); *B05D 7/04* (2013.01); *B29C 51/10* (2013.01); *B29C 2045/14704* (2013.01); *B29K 2669/00* (2013.01); *B29K 2995/0024* (2013.01)

(58) Field of Classification Search
CPC .............................................. B29C 45/14688
See application file for complete search history.

(56) References Cited

U.S. PATENT DOCUMENTS

| | | | |
|---|---|---|---|
| 5,108,530 A | 4/1992 | Niebling | |
| 5,733,651 A | 3/1998 | Wank | |
| 5,773,126 A * | 6/1998 | Noritake | ............... B05D 1/42 |
| | | | 428/143 |
| 5,820,957 A | 10/1998 | Schroeder et al. | |
| 5,938,881 A | 8/1999 | Kawata et al. | |
| 8,801,888 B2 | 8/2014 | Saitou | |
| 2004/0081764 A1 | 4/2004 | Liu et al. | |
| 2005/0191470 A1 | 9/2005 | Roys et al. | |
| 2010/0200157 A1 | 8/2010 | Kimura et al. | |
| 2011/0183120 A1 | 7/2011 | Sharygin | |
| 2013/0248095 A1 * | 9/2013 | Hou | ..................... B44C 1/17 |
| | | | 156/240 |
| 2015/0239159 A1 * | 8/2015 | Leonhardt | ........ B29C 45/1418 |
| | | | 428/141 |
| 2016/0238929 A1 | 8/2016 | Schmidt et al. | |

FOREIGN PATENT DOCUMENTS

| | | |
|---|---|---|
| CN | 1217792 A | 5/1999 |
| CN | 1964842 A | 5/2007 |
| WO | 9742529 | 11/1997 |
| WO | 2005068187 A2 | 7/2005 |

OTHER PUBLICATIONS

MacDermid Autotype, "Film Insert Moulding: Hard Coated Films, Designed to Be Different," Waterbury, Connecticut, USA (2015).

* cited by examiner

*Primary Examiner* — Galen H Hauth
(74) *Attorney, Agent, or Firm* — Carmody Torrance Sandak & Hennessey LLP

(57) ABSTRACT

Textured hardcoat films are disclosed for preferable use in film insert moulding. Texture in the hardcoat film is created through the use of a textured protective overlayer, which can impart texture to the curable coating of the hardcoat film. This process preferably avoids the need to alter the composition of the curable coating to allow for texture and preferably produces a hardcoat film with a matte and reduced-glare finish. An apparatus and a method embodying the invention are disclosed.

12 Claims, No Drawings

TEXTURED HARDCOAT FILMS

FIELD OF THE INVENTION

The present invention relates generally to textured hardcoat films, and in specific embodiments, to the texturing of hardcoat films to reduce glare by embossing, using a textured overlayer.

BACKGROUND OF THE INVENTION

Film Insert Moulding ("FIM") is a versatile and cost effective method of decorating and manufacturing plastic parts. FIM is an advanced form of In Mould Decoration (IMD) or In Mould Labeling (IML). These technologies use hardcoat films that may comprise a polymeric film substrate, a curable coating, and a protective overlayer. The hardcoat films may be reverse decorated with an image, preferably, though not exclusively, through screen printing. The films may then, optionally, be formed into three dimensional patterns, and then cut and back injection moulded to create a molded decorative article. The curable coating may be semi-cured at the beginning of the process. Semi-curing allows the coating to have enough physical integrity to survive the forming step and other processing, but is flexible enough to allow forming to occur. After forming, the semi-cured curable coating may be fully cured, preferably with ultraviolet radiation to provide toughness, hardness, scratch resistance, and/or solvent resistance or other properties useful for the molded decorative article. The protective overlayer may be removed before or after the forming step.

The molded decorative article with the finished hardcoat film may be used in a variety of applications, such as in the automotive, appliance, or telecom industries where there is a need for plastic parts with protective hardcoat films. Generally, the curable coating produces a gloss finished appearance for the molded decorative article. This may be aesthetically pleasing. However, applications for molded decorative articles exist where a gloss-finish has been discovered to be not desirable. For example, it has been discovered by the present invention that a gloss finish on a navigation display in an automobile may lead to unwanted glare. Additionally, it has been discovered by the present invention that these gloss finishes tactilely or haptically pleasing for users.

It has been discovered that such glare and/or haptic unpleasantness may be substantially reduced using hardcoat films with a matte finish. The matte finish is preferably created by texturing the outer surface of the semi-cured curable coating. This texturing is preserved through the final curing process and helps to create a matte appearance, thereby reducing glare. Such surfaces can also be designed to enhance the user's tactile experience, such as by giving them a "soft" or "smooth" feel.

One way to texture the outer surface of the curable coating is by adding a dispersion of particulates into the curable coating during formulation. These particulates project from the outer surface of the curable coating, even after final curing, thereby producing a matte finish with anti-glare properties. However, the inventors have discovered disadvantages to this process. The array of textures that may be produced by this method is somewhat limited by the availability of particulates that are of the correct size and shape and that can be dispersed in the formula to produce a stable mixture without precipitation, agglomeration, etc. Additionally, the particulate solution requires a manufacturer to maintain different formulation and production lines for curable coatings depending on whether a gloss or matte finish is desired. Further, the present inventors discovered that such textures may still not be haptically optimal. The present inventors have discovered these problems and the present invention, in preferred embodiments, may provide a solution.

SUMMARY OF THE INVENTION

It is an object of the present invention, at least in some embodiments, to provide an improved hardcoat film and an improved method of using the hardcoat film to create molded decorative articles.

It is another object of the present invention, at least in some embodiments, to provide for hardcoat films that can result in matte finishes after processing through texturing of the curable coating of the hardcoat film.

It is a further object of the present invention, at least in some embodiments, to provide for hardcoat films with textured that may be easily varied.

It is a further object of the present invention, at least in some embodiments, to provide for hardcoat films that can result in matte and/or haptically pleasant finishes after processing utilizing the same or similar formulations for the curable coating of the hardcoat film that are used in hardcoat films that produce gloss finishes.

In one embodiment, the present invention relates generally to a hardcoat film comprising:
a polymeric film substrate;
a curable coating having a first side and a second side, wherein the first side of the curable coating is disposed on the polymeric film substrate; and
a protective overlayer having a first side and a second side, wherein the first side of the protective overlayer is disposed on the second side of the curable coating;
wherein at least the first side of the protective overlayer is textured.

In another embodiment, the present invention relates generally to a hardcoat film comprising:
a polymeric film substrate; and
a curable coating having a first side and a second side, wherein the first side of the curable coating is disposed on the polymeric film substrate;
wherein the second side of the curable coating has embossed texturing.

In another embodiment, the present invention relates generally to a method of producing a molded decorative article comprising the steps of:
(i) providing a hardcoat film comprising:
a polymeric film substrate having a first side and a second side;
a curable coating having a first side and a second side, wherein the first side of the curable coating is disposed on the second side of the polymeric film substrate; and
a protective overlayer having a first side and a second side, wherein the first side of the protective overlayer is disposed on the second side of the curable coating;
wherein at least the first side of the protective overlayer is textured; and
wherein the texture of the first side of the protective overlayer is imparted to the second side of the curable coating;
(ii) printing an image on the hardcoat film;
(iii) removing the protective overlayer;
(iv) curing the curable coating;
(v) cutting the hardcoat film; and (vi) injection molding a plastic part on the first side of the polymeric film substrate.

The foregoing embodiment may also preferably include a step of forming the hardcoat film into a three-dimensional pattern.

As described in the foregoing embodiments, it has been discovered that texturing can be imparted to the curable layer of the hardcoat film by disposing a textured protective overlayer on top of it. Through this "impressing" or "embossing" the texture may be transferred from the overlayer to the curable layer. This texture is preserved through the final curing process, and may result in a matte finish for the hardcoat film. As used in this specification and in the claims of this invention, the term "texture," "textured," and "texturing," refer to a state of having a rough or raised surface, i.e., not a substantially flat surface. It is understood that even typical protective overlayers may have some surface imperfections such that it cannot be said that its surface is perfectly flat; however, such protective overlayer still have substantially flat surfaces within the meaning of this invention. In preferred embodiments, the texturing of the surfaces of the protective overlayers and the curable coatings may be such that it produces a matte finish and/or it produces a surface with anti-glare properties or at least substantially reduced glare compared to a gloss surface and/or produces a texture that is "smooth" or "soft" to the touch (though such properties are not within the essential definition of "textured" given above).

Additionally, as used in the present invention, the texture on the protective overlayer need not encompass the entire surface of the protective overlayer. It is sufficient if the protective overlayer comprises a textured surface. Thus, when the claims of this invention refer to a side of the protective overlayer being textured, it is to be understood that only a substantial portion of the side need be textured. Concomitantly, when only a portion of the protective overlayer is textured, this would mean that the texture would only be imparted to a portion of the curable layer. This, too, is similarly within the contemplation of the present invention and its claims.

DETAILED DESCRIPTION OF THE PREFERRED EMBODIMENTS

As described herein, in one embodiment, the present invention relates generally to a hardcoat film comprising:

a polymeric film substrate;

a curable coating having a first side and a second side, wherein the first side of the curable coating is disposed on the polymeric film substrate; and a protective overlayer having a first side and a second side, wherein the first side of the protective overlayer is disposed on the second side of the curable coating;

wherein at least the first side of the protective overlayer is textured.

In preferred embodiments, the polymeric film substrate may be a flexible film substrate, and most preferably comprise polycarbonate, polyester, PMMA, or multilayer coextrusions of one or more of these materials. Other polymers may be used if they are flexible enough to withstand thermal or vacuum forming and have sufficient integrity and hardness to protect the decorative plastic article.

The curable coating is preferably designed to be cured through polymerization using ultraviolet radiation. The curable coating may preferably comprise monomers, such as acrylate monomers that are known to persons of ordinary skill in the art. The curable coating may also preferably comprise photoinitiators to promote polymerization upon exposure to ultraviolet radiation.

The curable coating in the present embodiment is preferably in a semi-cured state. This may be accomplished during the manufacturing process, i.e., before it is sold for use by a customer in the molding process. The curable coating may preferably be semi-cured by exposing it to some ultraviolet radiation or heating it to induce a partial thermal cure, but not enough such radiation or heat to cause all of the monomers to fully polymerize and harden. Semi-curing the curable composition allows the coating to have enough physical integrity to survive the forming step and other processing, but allows it to be flexible enough to allow forming to occur. After forming, the semi-cured curable coating may be fully cured, preferably with ultraviolet radiation to provide toughness, hardness, scratch resistance, and/or solvent resistance or other properties useful for the molded decorative article. Semi-curing the curable layer also ensures sufficient adhesion between it and the polymeric film substrate.

The protective overlayer preferably comprises a flexible polymer/plastic. The protective overlayer may provide addition protection to the curable layer during the moulding process prior to the curable layer being fully cured with ultraviolet radiation. Thus, preferably, the protective overlayer may be removed after the step of printing or after the optional step of forming the hardcoat film. As discussed, at least the side of the protective overlayer that is disposed on the curable layer is textured. This texture is imparted to the curable layer, preferably through what may generally be referred to as "impression" or "embossing." The normal conditions of the manufacturing process wherein the protective overlayer is installed on the curable layer may impart sufficient pressure between the protective overlayer and the curable layer to impart the protective overlayer's texture to the curable layer. Alternatively, or additionally, or optionally, additional pressure or heat may be used to ensure that the texture is imparted to the curable layer. Any set of conditions that result in substantial imparting of the texture to the curable layer is what is meant by "impression" or "embossing."

Alternatively, it may be desirable to provide to customers normal hardcoat films having a gloss protective overlayer and then allowing the customers to choose whether to texture the curable layer. This can be accomplished by providing a customer with a separate textured overlayer as well. The gloss overlayer may then be removed and replaced with the textured overlayer. Again, the hardcoat layer would then be subjected to a set of conditions sufficient to substantially impart the texture of the overlayer onto the curable layer. In this manner, the customer may potentially reuse the textured overlayers and/or will only need to buy one type of hardcoat film without deciding necessarily whether to create gloss films, matte films, or both.

As described herein, in another embodiment, the present invention relates generally to a hardcoat film comprising: a polymeric film substrate; and a curable coating having a first side and a second side, wherein the first side of the curable coating is disposed on the polymeric film substrate; wherein the second side of the curable coating has embossed texturing. The embodiment may relate to the composition of hardcoat films after manufacture in the state described in the first embodiment. In such an arrangement, the invention according to this embodiment may additionally comprise the protective overlayer as discussed above. The aspect of the invention described in the present embodiment may also relate to the state of the hardcoat film during the method of moulding, specifically after the textured protective overlayer has been removed.

As described herein, in a third embodiment, the present invention relates generally to a method of producing a molded decorative article comprising the steps of:

(i) providing a hardcoat film comprising:
a polymeric film substrate having a first side and a second side;
a curable coating having a first side and a second side, wherein the first side of the curable coating is disposed on the second side of the polymeric film substrate; and
a protective overlayer having a first side and a second side, wherein the first side of the protective overlayer is disposed on the second side of the curable coating;
wherein at least the first side of the protective overlayer is textured; and
wherein the texture of the first side of the protective overlayer is imparted to the second side of the curable coating;
(ii) printing an image on the hardcoat film;
(iii) removing the protective overlayer;
(iv) curing the curable coating;
(v) cutting the hardcoat film; and
(vi) injection molding a plastic part on the first side of the polymeric film substrate.

It is to be recognized and understood that the foregoing list of steps need not necessarily be performed in the order described. Additionally the step of the method of producing a molded decorative article involving providing a hardcoat film as described has been discussed previously.

The method of producing a molded decorative article involves a step of printing an image on the hardcoat film. Preferably, the hardcoat film is reverse printed, i.e., the printing takes place on the first side of the polymeric film substrate. This allows the ink to be "encased" in the finished molded decorative article, between the curable layer (which would be cured at the end of the method) and polymeric film substrate on one hand and the injection molded plastic. In preferred embodiments, screen printing methods, which are understood by those of ordinary skill in the art, are used to accomplish the printing contemplated by the present invention.

The method of producing a molded decorative article optionally involves a further step of forming the hardcoat film into a three-dimensional pattern. This step is performed if one desires the final molded decorative article to not be flat, i.e., to have a three-dimensional surface, such as a rounded surface. Such three-dimensional patterns are especially desirable in the automotive, appliance, and telecom industries. The forming may preferably be accomplished using a die and/or heat and/or a vacuum to set and/or thermoset the hardcoat film into a three-dimensional pattern. Obviously, if a three-dimensional pattern is going to be formed, this would need to be accounted for in the printing step. Normally, the hardcoat film is printed while flat; therefore, the printed two-dimensional image would need to account for distortions caused by the three-dimensioned forming step.

The method of producing a molded decorative article also involves a further step of curing the curable coating. In a preferred embodiment, this is accomplished by exposing the hardcoat film to actinic radiation, most preferably ultraviolet actinic radiation. Curing can also be accomplished thermally as discussed above. The wavelength of actinic radiation is preferably chosen to correspond to the optimal wavelength for the photoiniator and/or monomer used in the curably layer composition. The step of curing the curable coating preferably results in a "fully" cured curable layer. It is to be understood that not all 100% of the monomer needs to be fully polymerized in order for the curable layer to be deemed fully cured by persons of ordinary skill in the art. It is sufficient if the layer is substantially cured, preferably such that has toughness, hardness, scratch resistance, and/or solvent resistance or other properties useful for the molded decorative article. It is preferred, but not required, that the step of curing the curable layer takes place after the steps of printing and forming. It is preferred that the curable layer not be fully hardened at during those steps, for example to facilitate the ease with which the film may be flexed and formed into the desired shape.

The method of producing a molded decorative article also involves a further step of removing the protective overlayer. This can preferably by accomplished by hand. The step of removing the protective overlayer may preferably occur after printing or after forming. In either event, it is highly preferable to remove the protective overlayer before the step of curing the curable layer to avoid the creation of undue adhesion between the protective overlayer and the cured curable layer.

The method of producing a molded decorative article also involves a further step of cutting the hardcoat film. The step of cutting preferably removes portions of the hardcoat film that are not required by the desired pattern or image. It is preferred that unprocessed hardcoat films are sold in standard sizes and shapes; however, it is preferable for customers to be able to prepare molded decorative articles of any size and shape. The cutting process preferably sizes and shapes the hardcoat film to correspond with the size and shape desired for the molded decorative article. The cutting process is preferably carried out with a sharpened die or with a cutting implement.

The method of producing a molded decorative article also involves a further step of injection molding a plastic part on the first side of the polymeric film substrate. It is to be understood that ink from the printing step would preferably be more directly disposed on the first side of the polymeric film substrate, which would also and preferably be within the contemplation of the present invention and its claims and within the meaning of the term "on the first side of the polymeric film substrate." Persons of ordinary skill in the art understand the process of creating injection molded plastic on hardcoat films as claimed and described.

EXAMPLES

The following examples are given to illustrate preferred embodiments of the invention and to further describe and show potential advantages and unexpected results of practicing preferred embodiments of this invention. Nothing in the following examples should be construed as a limitation on the invention as claimed below.

Example 1 (Comparative)

A solution (solution 1.1) was made up as follows;

| Component | Wt % |
|---|---|
| Epoxidised styrenic resin | 13.3 |
| Acrylic resin | 0.9 |
| Acrylated oligomer | 2.0 |
| UV-Photoinitiator | 1.6 |

| Component | Wt % |
|---|---|
| Silicon dioxide dispersed in acrylic monomer | 6.7 |
| Blend of organic solvents (esters) | 75.5 |
| Total | 100.0 |

This formula was applied to a 250 microns polycarbonate film substrate by means of roller coating to a wet thickness of 70 microns. The wet coating was dried and partially cured in an oven at 100° C. to give a tack free curable coating.

A second solution (solution 1.2) was made up as follows;

| Component | Wt % |
|---|---|
| Poly(vinyl alcohol) resin | 6.9 |
| Acrylic resin | 5.5 |
| Surfactant | 1.1 |
| Water | 86.5 |
| Total | 100.0 |

This formula was then applied to the material coated above, applied as a protective overlayer to the curable coating by means of roller coating to a wet thickness of 220 microns. The protective overlayer was then dried in an oven at 90° C. to give a tack free surface.

A sheet was cut from this material, of size 305×458 mm, and the protective overlayer was peeled away manually. The remaining film was then placed in a vacuum former and heated to approximately 150° C. for 9 seconds whilst in contact with a tool containing machined features to create a three dimensional formed shape. This formed part was then fully cured by means of exposure to UV radiation at a dose of 1 J/cm$^2$ by means of passage through a DRSE-120 UV conveyor system supplied by Fusion UV systems, fitted with H-type bulbs. The resultant film was found to have a glossy surface. Roughness measurements were taken from the surface of the part with a Surtronic 25 surface profile gauge and gave Ra=0.01 μm and Rz=0.04 μm. The surface of the film was also measured using a REFO3 Gloss meter with a 60° angle and gave a measurement of 92 Gloss Units.

Example 2 (Invention)

Solution 1.1 from Example 1 was again applied to a 250 microns polycarbonate film substrate by means of roller coating to a wet thickness of 70 microns. The wet coating was dried and partially cured in an oven at 100° C. to give a tack free curable coating.

A second solution (solution 2.2) was made up as follows;

| Component | Wt % |
|---|---|
| Poly(vinyl alcohol) resin | 6.9 |
| Acrylic resin | 5.5 |
| Surfactant | 1.1 |
| Silicon dioxide filler (Acematt OK 412) | 0.5 |
| Water | 86.0 |
| Total | 100.0 |

This formula was then applied to the material coated above, applied as a protective overlayer to the first coated layer by means of roller coating to a wet thickness of 220 microns. The protective overlayer was then dried in an oven at 90° C. to give a tack free surface.

A sheet was cut from this material, of size 305×458 mm, and the protective overlayer was peeled away manually. The remaining film was then placed in a vacuum former and heated to approximately 150° C. for 9 seconds whilst in contact with a tool containing machined features to create a three dimensional formed shape. This formed part was then fully cured by means of exposure to UV radiation at a dose of 1 J/cm$^2$ by means of passage through a DRSE-120 UV conveyor system supplied by Fusion UV systems, fitted with H-type bulbs. The resultant film was found to have a textured surface. Roughness measurements were taken from the surface of the part with a Surtronic 25 surface profile gauge and gave Ra=0.18 μm and Rz=1.41 μm. The surface of the film was also measured using a REFO3 Gloss meter with a 60° angle and gave a measurement of 36 Gloss Units.

Example 3 (Invention)

Solution 1.1 from Example 1 was again applied to a 250 microns polycarbonate film substrate by means of roller coating to a wet thickness of 70 microns. The wet coating was dried and partially cured in an oven at 100° C. to give a tack free curable coating.

A second solution (solution 3.2) was made up as follows;

| Component | Wt % |
|---|---|
| Poly(vinyl alcohol) resin | 6.9 |
| Acrylic resin | 5.5 |
| Surfactant | 1.1 |
| Silicon dioxide filler (Acematt OK 412) | 0.3 |
| Water | 86.2 |
| Total | 100.0 |

This formula was then applied to the material coated above, applied as a protective overlayer to the first coated layer by means of roller coating to a wet thickness of 220 microns. The protective overlayer was then dried in an oven at 90 C to give a tack free surface.

A sheet was cut from this material, of size 305×458 mm, and the protective overlayer was peeled away manually. The remaining film was then placed in a vacuum former and heated to approximately 150 C for 9 seconds whilst in contact with a tool containing machined features to create a three dimensional formed shape. This formed part was then cured by means of exposure to UV radiation at a dose of 1 J/cm$^2$ by means of passage through a DRSE-120 UV conveyor system supplied by Fusion UV systems, fitted with H-type bulbs. The resultant film was found to have a textured surface. Roughness measurements were taken from the surface of the part with a Surtronic 25 surface profile gauge and gave Ra=0.12 μm and Rz=1.10 μm. The surface of the film was also measured using a REFO3 Gloss meter with a 60° angle and gave a measurement of 55 Gloss Units.

Example 4 (Invention)

Solution 1.1 from Example 1 was again applied to a 250 microns polycarbonate film substrate by means of roller coating to a wet thickness of 70 microns. The wet coating was dried and partially cured in an oven at 100° C. to give a tack free curable coating.

Solution 2.2 was then applied to the material coated above, applied as a protective overlayer to the first coated layer by means of roller coating to a wet thickness of 220 microns. The protective overlayer was then dried in an oven at 90 C to give a tack free surface.

This was then processed as follows, with the coated layer applied from Solution 2.2 remaining in place until after forming. A sheet was cut from this coated material, of size 305×458 mm. The sheet of film was then placed in a vacuum former and heated to approximately 150° C. for 9 seconds whilst in contact with a tool containing machined features to create a three dimensional formed shape. The protective overlayer layer was then peeled away manually. This formed part was then cured by means of exposure to UV radiation at a dose of 1 J/cm$^2$ by means of passage through a DRSE-120 UV conveyor system supplied by Fusion UV systems, fitted with H-type bulbs. The resultant film was found to have a textured surface. Roughness measurements were taken from the surface of the part with a Surtronic 25 surface profile gauge and gave Ra=0.17 μm and Rz=1.52 μm. The surface of the film was also measured using a REFO3 Gloss meter with a 60° angle and gave a measurement of 31 Gloss Units.

Typical and preferred embodiments have been described herein for purposes of illustration. The foregoing preferred embodiments should not be considered to limit the scope of the invention, which is described in the following claims as understood by one having ordinary skill in the art. Various alternatives, modifications, adaptations, and additions will occur to one skilled in the art without departing from the scope of the invention described by the claims herein.

What is claimed is:

1. A method of producing a molded decorative article comprising the steps of:
    (i) providing a hardcoat film comprising:
        a polymeric film substrate having a first side and a second side;
        a curable coating having a first side and a second side, wherein the first side of the curable coating is disposed on the second side of the polymeric film substrate; and
        a protective overlayer having a first side and a second side, wherein the first side of the protective overlayer is disposed on the second side of the curable coating;
        wherein at least the first side of the protective overlayer is textured; and
        wherein the texture of the first side of the protective overlayer is imparted to the second side of the curable coating;
    (ii) printing an image on the hardcoat film;
    (iii) removing the protective overlayer;
    (iv) forming the hardcoat film into a three-dimensional pattern by using one or more of heat and vacuum to set or thermoset the hardcoat film into the three-dimensional pattern;
    (v) curing the curable coating;
    (vi) cutting the hardcoat film; and
    (vii) injection molding a plastic part on the first side of the polymeric film substrate.

2. The method according to claim 1, wherein the step of removing the protective overlayer occurs either before or after the step of forming the hardcoat film into a three-dimensional pattern.

3. The method according to claim 1 wherein the curable coating is curable with ultraviolet radiation and wherein the step of curing the curable coating is performed using ultraviolet radiation.

4. The method according to claim 1 wherein the texture of the second side of the curable coating reduces glare.

5. The method according to claim 1 wherein the texture of the second side of the curable coating is soft or smooth to the touch.

6. The method according to claim 1 wherein a second protective overlayer having a first side and a second side is removed from the hardcoat film prior to the step of providing a hardcoat film with the protective overlayer, and wherein the second side of the second protective overlayer is not textured and is disposed on the second side of the curable coating prior to the step of providing a hardcoat film with the protective overlayer.

7. The method according to claim 1 wherein the polymeric film substrate is polycarbonate, polyester, or PMMA.

8. The method according to claim 1 wherein steps (i) through (vii) are performed in order.

9. The method according to claim 1, wherein the curable coating is partially thermal cured prior to step (iv).

10. The method according to claim 1, wherein the hardcoat film is formed into a three-dimensional pattern by vacuum forming to create the three-dimensional formed shape and is thereafter fully cured by exposure to UV radiation.

11. The method according to claim 1, wherein only a portion of the protective overlayer is textured, wherein the texture is imparted to only a corresponding portion of the curable layer.

12. A method of producing a molded decorative article comprising the steps of:
    (i) providing a hardcoat film comprising:
        a polymeric film substrate having a first side and a second side;
        a curable coating having a first side and a second side, wherein the first side of the curable coating is disposed on the second side of the polymeric film substrate; and
        a protective overlayer having a first side and a second side, wherein the first side of the protective overlayer is disposed on the second side of the curable coating;
        wherein at least the first side of the protective overlayer is textured; and
        wherein the texture of the first side of the protective overlayer is imparted to the second side of the curable coating;
    (ii) printing an image on the hardcoat film;
    (iii) removing the protective overlayer;
    (iv) forming the hardcoat film into a three-dimensional pattern by vacuum forming to create the three-dimensional formed shape;
    (v) curing the curable coating by exposure to UV radiation;
    (vi) cutting the hardcoat film; and
    (vii) injection molding a plastic part on the first side of the polymeric film substrate.

* * * * *